United States Patent [19]

Fujiki

[11] Patent Number: 5,211,604
[45] Date of Patent: May 18, 1993

[54] AIR CONDITIONER FOR USE IN AN AUTOMOTIVE VEHICLE

[75] Inventor: Tsutomu Fujiki, Hiroshima, Japan

[73] Assignee: Mazda Motor Corporation, Hiroshima, Japan

[21] Appl. No.: 811,532

[22] Filed: Dec. 20, 1991

[30] Foreign Application Priority Data

Dec. 29, 1990 [JP]  Japan .................................. 2-416774

[51] Int. Cl.⁵ ............................................. B60H 1/00
[52] U.S. Cl. .................................... 454/144; 454/160
[58] Field of Search ................ 454/75, 144, 156, 159, 454/160

[56] References Cited

U.S. PATENT DOCUMENTS 4,586,652  5/1986  Sakurai .............................. 454/75 X
4,938,033  7/1990  Ogihara ............................. 454/75 X

FOREIGN PATENT DOCUMENTS

61017  4/1983  Japan ..................................... 454/75
60-139518  7/1985  Japan .

Primary Examiner—Robert G. Nilson
Attorney, Agent, or Firm—Fish & Richardson

[57] ABSTRACT

An air conditioner suited for use in an automotive vehicle has a plurality of emission modes in which appropriately regulated air is directed to a plurality of locations on the front side of a passenger compartment defined in the automotive vehicle. The air conditioner includes a blower unit for introducing external air into the passenger compartment or circulating internal air and an air chamber formed on the downstream side of the blower unit in the direction of air flow. A rear duct is branched and extends rearwardly from the air chamber so that air from the blower unit may be fed to a rear portion of the passenger compartment through the rear duct. A damper or a blower is mounted in the rear duct to restrict the air volume to be fed to the rear portion of the passenger compartment when the temperature of external air is less than a given value.

9 Claims, 7 Drawing Sheets

AIR CONDITIONER FOR USE IN AN AUTOMOTIVE VEHICLE

BACKGROUND OF THE INVENTION

1. Field of the Invention

The present invention relates generally to an air conditioner for use in an automotive vehicle, and more particularly to an air conditioner having a rear duct for introducing appropriately regulated air to a rear portion of a passenger compartment.

2. Description of the Prior Art

Japanese Patent Laid-open Application (unexamined) No. 60-139518 discloses an air conditioner, suited for use in an automotive vehicle, for introducing appropriately regulated air from the front side to a passenger compartment. The air conditioner is provided with a rear duct branched and extending rearwardly from an air chamber formed downstream of a blower so that appropriately regulated air may be fed to rear seats through the rear duct.

In an automotive vehicle, air from an air conditioner is generally initially fed to front seats and then to rear seats. However, the provision of a rear duct enables appropriately regulated air to be positively fed to the rear seats. By way of example, the rear duct is branched from an air chamber formed between a cooling unit and a heating unit. When a passenger compartment reaches a stable warm condition during a heating operation of the air conditioner, appropriately regulated air having a relatively low temperature is directed to the head or the upper part of the body of a rear seat occupant through the rear duct to make him cool, thereby enhancing the comfortability of his sitting on the rear seats.

This kind of air conditioner is generally provided with an opening and closing means, for example a damper, for opening and closing the rear duct or a rear blower dedicated for use by a rear seat occupant. Manipulation of such means with the use of a manual switch i.e., a rear air conditioner switch controls air to be introduced to the rear seats according to the will of the rear seat occupant.

However, when the rear seat occupant gets off the automotive vehicle, he occasionally forgets turning off the manual switch. In this case, OFF-operation of an ignition switch followed by the stop in operation of the air conditioner terminates the introduction of air to the rear. Thereafter, when the ignition switch is turned on to start the automotive vehicle, the manual switch is also turned on at the same time.

Because of this, when the ignition switch is turned on under the conditions in which the temperature of external air is very low, for example, in winter, cold air is suddenly introduced to the rear through the rear duct, thus making the rear seat occupant uncomfortable.

SUMMARY OF THE INVENTION

The present invention has been developed to overcome the above-described disadvantages.

It is accordingly an object of the present invention to provide an improved air conditioner for use in an automotive vehicle which is capable of controlling the introduction of cold air to the rear when an engine is started at a relatively low temperature.

Another object of the present invention is to provide an air conditioner of the above-described type which has a simple construction and can be readily manufactured at a low cost.

In accomplishing these and other objects, an air conditioner according to the present invention has a plurality of emission modes in which appropriately regulated air is directed to a plurality of locations on the front side of a passenger compartment defined in an automotive vehicle. The air conditioner includes a blower unit, disposed on the front side of the passenger compartment, for introducing external air into the passenger compartment or circulating internal air and an air chamber formed on a downstream side of the blower unit in a direction of air flow. A rear duct is branched and extends rearwardly from the air chamber, thereby feeding air from the blower unit to a rear portion of the passenger compartment.

The air conditioner further includes air volume restriction means for restricting the air volume to be fed to the rear portion of the passenger compartment when the temperature of external air is less than a given value.

The air volume restriction means restricts the introduction of cold air to the rear when an engine is started at a low temperature.

Preferably, the air volume restriction means continues to restrict the air volume until a desired emission mode is selected.

Conveniently, the air volume restriction means comprises means for opening and closing the rear duct and a manual switch operatively connected to the means for opening and closing the rear duct.

Alternatively, the air volume restriction means comprises a rear blower mounted in the rear duct and means for controlling the air volume to be fed by the rear blower.

Preferably, means for controlling the air volume comprises a manual switch operatively connected to the rear blower so that the air volume restriction means restricts the air volume to a smaller value than a setting given by the manual switch until a desired emission mode is selected.

BRIEF DESCRIPTION OF THE DRAWINGS

These and other objects and features of the present invention will become more apparent from the following description of preferred embodiments thereof with reference to the accompanying drawings, throughout which like parts are designated by like reference numerals, and wherein.

DETAILED DESCRIPTION OF THE PREFERRED EMBODIMENTS

Figure 1:
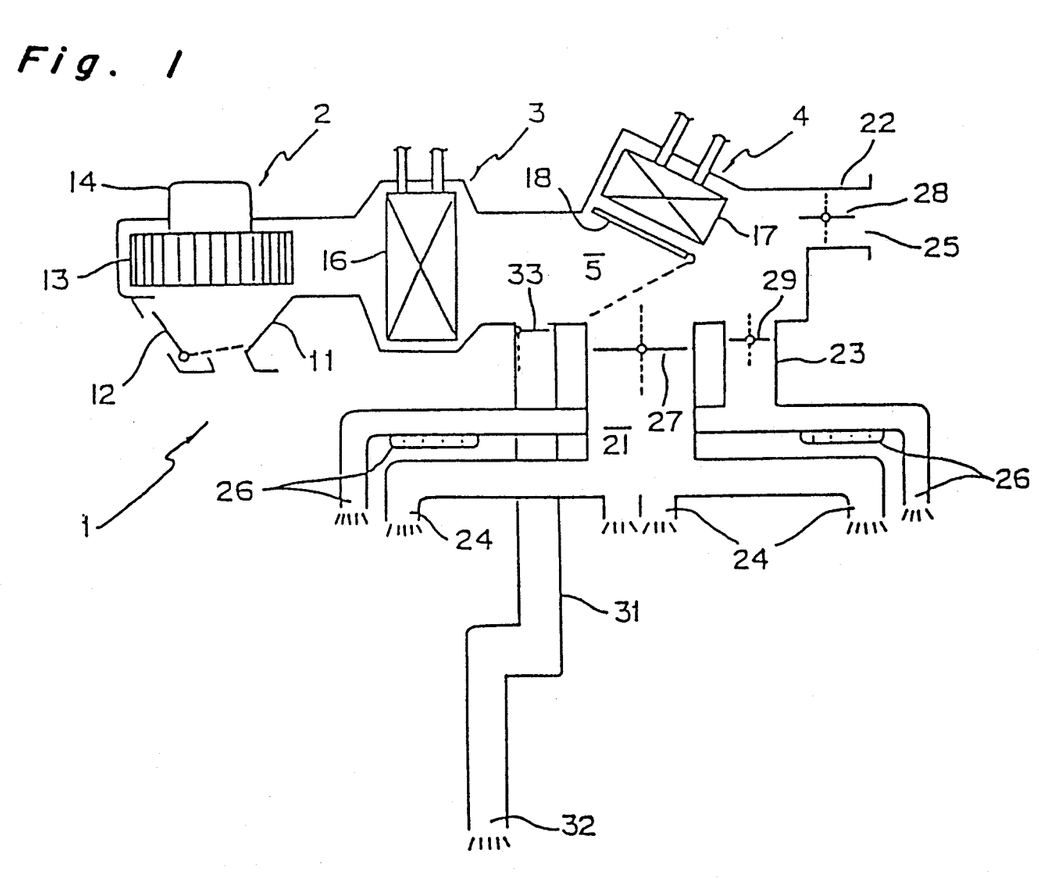
FIG. 1 is a schematic view of an air conditioner according to a first embodiment of the present invention.

Referring now to the drawings, there is schematically shown in FIG. 1 an air conditioner 1 embodying the present invention, which is disposed on the front side of a passenger compartment defined in an automotive vehicle.

The air conditioner 1 comprises a blower unit 2 for introducing air to be appropriately regulated into the air conditioner 1, a cooling unit 3 for cooling the air by means of an evaporator 16, and a heating unit 4 for warming the air by means of a heater core 17, in which cooling water for an engine (not shown) is used as a heat source. The blower unit 2, the cooling unit 3, and the heating unit 4 are disposed in this order from the upstream side toward the downstream side in the direction of air flow. On the downstream side of the cooling unit 3 or the heating unit 4 is formed an air chamber 5, which communicates with air outlets 24 for air vent, an air outlet 25 for heating, and air outlets 26 of a windshield defroster through respective air ducts 21, 22, and 23. These air outlets 24, 25, and 26 are open to the front side of the passenger compartment.

The heating unit 4 is internally provided with an air mixing door 18 for controlling the temperature of air by regulating the amount of air passing the heater core 17. The air ducts 21, 22, and 23 are internally provided with respective dampers 27, 28, and 29 for switching a vent mode, a heating mode, and a defroster mode.

The blower unit 2 comprises an air intake box 11 for switching between introduction of external air thereinto and circulation of internal air, a blower 13 for feeding introduced air toward the downstream side, and a blower motor 14 drivingly coupled to the blower 13. The mixing ratio between the internal air and the external air can be regulated by controlling the opening of a damper 12 mounted in the air intake box 11 whereas the amount of air can be regulated by controlling the speed of the blower motor 14.

Figure 3:
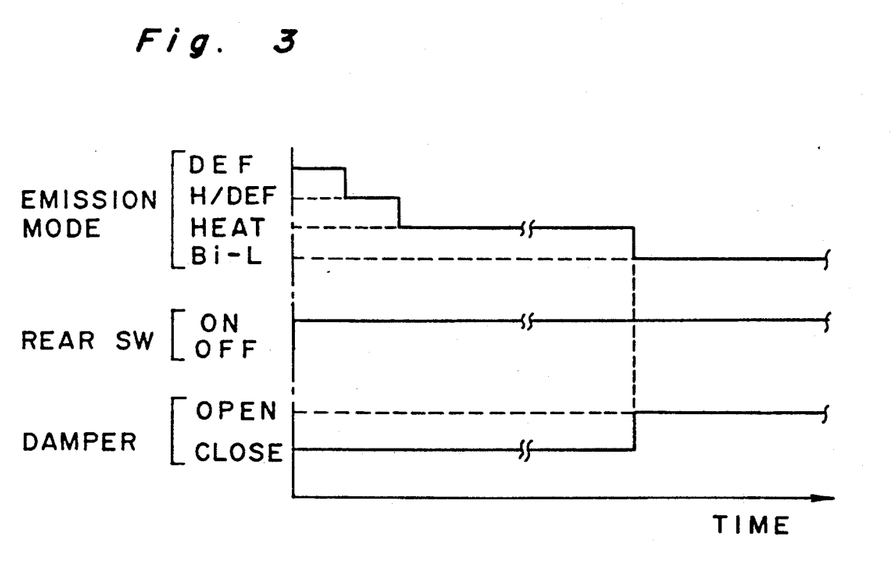
FIG. 3 is a graph indicative of the operation of the air conditioner.

The above-described air conditioner 1 is a so-called automatic air conditioner having an automatic control function and an automatic mode switching function. In winter, when a considerably cold passenger compartment is warmed by the air conditioner 1, the automatic control function automatically switches the emission mode, for example, from a defroster (DEF) mode to a heating/defroster (HEAT/DEF) mode and to a heating (HEAT) mode, as shown in FIG. 3. In the heating mode, when the average temperature in the passenger compartment reaches a predetermined temperature and a stable warm condition is maintained, the emission mode is automatically switched to a bi-level (Bi-L) mode.

The defroster mode is an initial mode set after the starting of an engine. In this mode, appropriately regulated air is directed to the windshield via the air outlets 26 to defrost the windshield. The heating mode is a mode in which warm air is directed to feet of a front seat occupant via the air outlet 25. The bi-level mode is a heating mode in which, while the feet of the front seat occupant are warmed by the warm air from the air outlet 25, cool air from the air outlets 24 is directed to his head or the upper part of his body so that the most comfortable condition in temperature distribution may be maintained.

In this embodiment, a rear duct 31 is branched from an air chamber 5 communicating the cooling unit 3 and the heating unit 4 and is extended rearwardly to send air from the air conditioner 1 to the rear. A damper 33 is provided in the proximity of an inlet portion of the rear duct 31 to control the amount of air to be introduced from the air chamber 5 into the rear duct 31.

The rear duct 31 has a rear air outlet 32, from which air is emitted toward the head or the upper part of the body of a rear seat occupant. During a warming operation of the air conditioner 1, when the passenger compartment reaches a stable warm condition, relatively cool air is emitted toward his head or the upper part of his body to make him cool, thereby enhancing the comfortability in the passenger compartment.

In the meantime, when the temperature of external air is extremely low, for example, in winter and when an ignition switch is turned on, a rear seat occupant would suddenly receive cold air from the rear air outlet 32 and feel uncomfortable. To prevent this, the opening of the damper 33 is restricted until the emission mode on the front side is switched to a desired warming mode when the temperature of external air is below a predetermined value.

Figure 2:
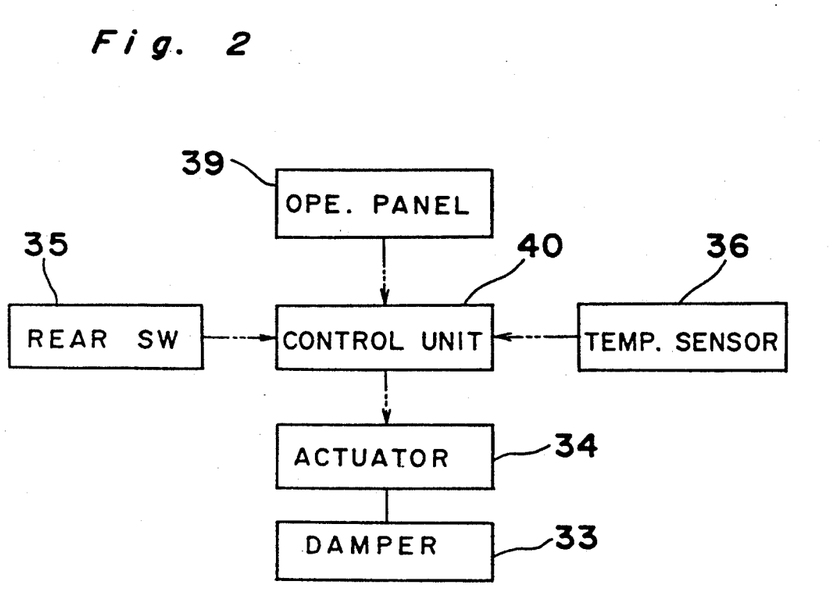
FIG. 2 is a block diagram of a control system for controlling a damper mounted in a rear duct.

FIG. 2 schematically depicts a control system for the damper 33.

As shown in FIG. 2, a damper actuator 34 for driving the damper 33 is electrically connected to a control unit 40 for the air conditioner 1. The control unit 40 comprises, for example, a microcomputer to control the air conditioner 1 in response to input operation via an operation panel 39 with a plurality of operation buttons or switches. To the control unit 40 are inputted a signal from a manually operated rear air conditioner switch 35 and that from an external air temperature sensor 36 for detecting the temperature of external air.

Although not shown, signals from an internal air temperature sensor, an evaporator sensor, a solar radiation sensor, or other various sensors are also inputted to the control unit 40, as well as the signal from the external air temperature sensor 36. Furthermore, the blower motor 14 and various actuators for driving the air mixing door 18 and the dampers 12, 27, 28, and 29 are also electrically connected to the control unit 40, as well as the actuator 34 for driving the damper 33.

Figure 4:
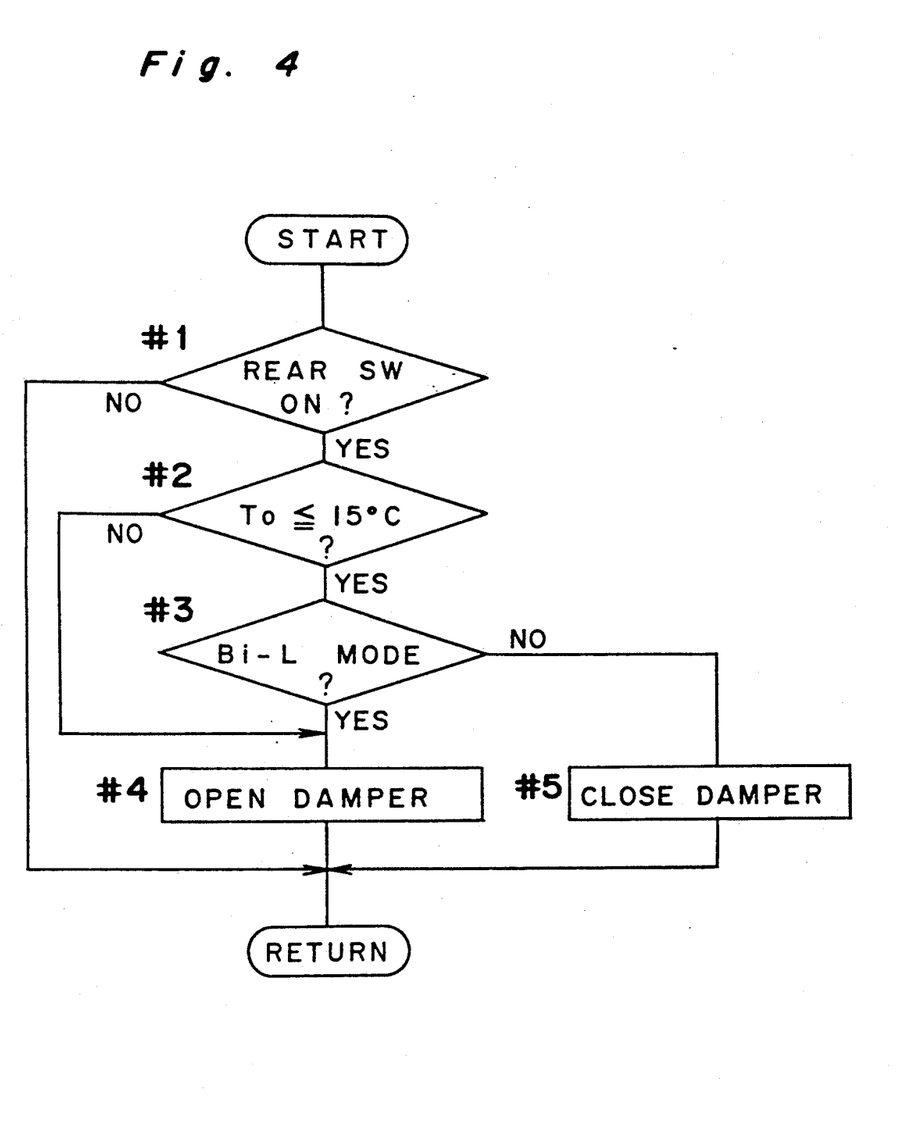
FIG. 4 is a flow-chart indicative of the operation of the damper.

The control of the damper 33 is described hereinafter with reference to a flow-chart of FIG. 4.

When the operation of the air conditioner 1 starts, it is determined at step #1 whether the rear switch 35 is on. If YES, it is determined at step #2 whether the temperature To of external air is less than or equal to a predetermined temperature, for example 15° C. If the result of determination at step #2 is NO i.e., if the temperature To of external air is greater than 15° C., the damper 33 is opened to send appropriately regulated air to the rear (step #4). In contrast, if the result of determination at step #2 is YES, it is determined at step #3 whether the emission mode on the front side is set to the desired stable mode (bi-level mode). If YES, the damper 33 is opened to send appropriately regulated air to the rear (step #4), but if NO, the damper 33 is kept closed (step #5).

More specifically, when the temperature of external air is less than or equal to 15° C., the damper 33 is kept closed until the emission mode on the front side is set to the bi-level mode. As a result, no air is fed to the rear via the rear duct 31.

As described above, according to the present invention, when the temperature of external air is less than or equal to a predetermined temperature (for example, 15° C.), the opening of the damper 33 for opening and closing the rear duct 31 is restricted to zero until the emission mode on the front side is set to the stable heating mode (bi-level mode). Accordingly, when the engine is started at a low temperature, the emission of cold air to the rear is restricted, thereby enhancing the comfortability in a rear portion of the passenger compartment.

Figure 5:
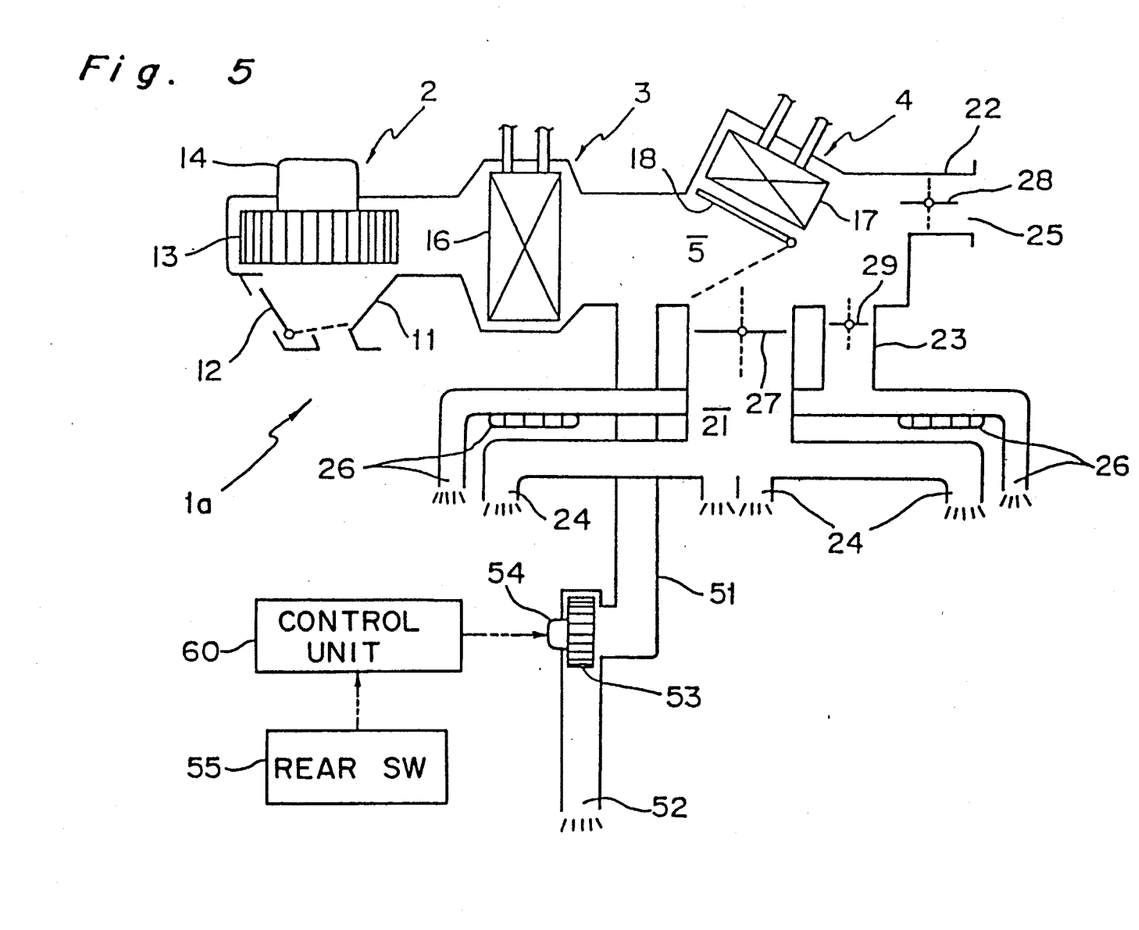
FIG. 5 is a view similar to FIG. 1, according to a second embodiment of the present invention.

FIG. 5 schematically depicts an air conditioner 1a according to a second embodiment of the present invention.

In the air conditioner 1a shown in FIG. 5, a rear blower 53 is mounted in the course of a rear duct 51, without providing a damper at an inlet portion of the rear duct 51. Air to be fed to the rear is controlled by the rear blower 53. More specifically, a blower motor 54 is drivingly coupled with the rear blower 53 and is electrically connected to a control unit 60, to which are electrically connected rear air conditioner switches 55. Manipulation of the rear air conditioner switches 55 causes the control unit 60 to output control signals required for ON/OFF and speed control of the blower motor 54, thereby controlling the amount of air to be fed from a rear air outlet 52 by the rear blower 53.

The rear air conditioner switches 55 include a volume selector (not shown), as well as an ON/OFF switch. The volume selector controls the speed of the rear blower 53 so that the amount of air to be emitted from the rear air outlet 52 may be set at one of a plurality of, for example three, levels. When the volume selector is set to "Lo" (low level), "Md" (middle) or "Hi" (high level), the rear blower 53 feeds air at level "1", "2", or "3", respectively. The air volume at level "2" is greater than that at level "1". Level "3" is the highest level in air volume.

In this embodiment, when the temperature of external air is less than or equal to a predetermined temperature (for example 15° C.), the amount of air to be fed to the rear by the rear blower 53 is restricted at a lower level than a setting given by the volume selector until the emission mode on the front side is set to the desired heating mode.

More specifically, as shown in Table 1, when the temperature To of external air is greater than 15° C., the control is normally performed in compliance with the volume selector irrespective of the emission mode on the front side. When the temperature To of external air is less than or equal to 15° C. but greater than 10° C. and when the emission mode on the front side is the heating mode, the amount of air to be fed by the rear blower 53 is set at level "1" irrespective of a setting by the volume selector. When the emission mode is the bi-level mode, the control is normally performed.

When the temperature of external air is less than 10° C. but greater than 0° C. and when the emission mode on the front side and the volume selector are set to the heating mode and "Hi", respectively, the amount of air to be fed by the rear blower 53 is set at level "1". However, when the volume selector is set to "Lo" or "Md", the rear blower 53 is turned off. When the emission mode is the bi-level mode and when the volume selector is set to "Md" or "Hi", the amount of air to be fed by the rear blower 53 is set at level "1". When the emission mode is the bi-level mode and when the volume selector is set to "Lo", the rear blower 53 is turned off.

Furthermore, when the temperature of external air is less than or equal to 0° C. and when the emission mode on the front side is the heating mode, the rear blower 53 is turned off irrespective of a setting of the volume selector. However, when the emission mode is the bi-level mode, air is fed from the rear blower 53 at level "1" irrespective of a setting of the volume selector.

When the emission mode on the front side is switched to the vent mode and when the temperature of external air is relatively high, the control is performed in the same manner as the bi-level mode. However, when the emission mode is the defroster or heating/defroster mode, the rear blower 53 is turned off irrespective of a setting of the volume selector.

TABLE I

| Temp of Ex. Air (To) | Emis. Mode (Front) | Rear Air Volume | Level |
|---|---|---|---|
| To > 15° C. (Normal Control) | HEAT | Lo | 1 |
|  | Bi-L | Md | 2 |
|  |  | Hi | 3 |
| 10° C. < To ≦ 15° C. | HEAT | Lo, Md, Hi | 1 |
|  | Bi-L | Lo | 1 |
|  |  | Md | 2 |
|  |  | Hi | 3 |
| 0° C. < To ≦ 10° C. | HEAT | Lo, Md | OFF |
|  |  | Hi | 1 |
|  | Bi-L | Lo | OFF |
|  |  | Md, Hi | 1 |
|  |  | Hi | 3 |
| To ≦ 0° C. | HEAT | Lo, Md, Hi | OFF |
|  | Bi-L | Lo, Md, Hi | 1 |

Figures 6, 6A:
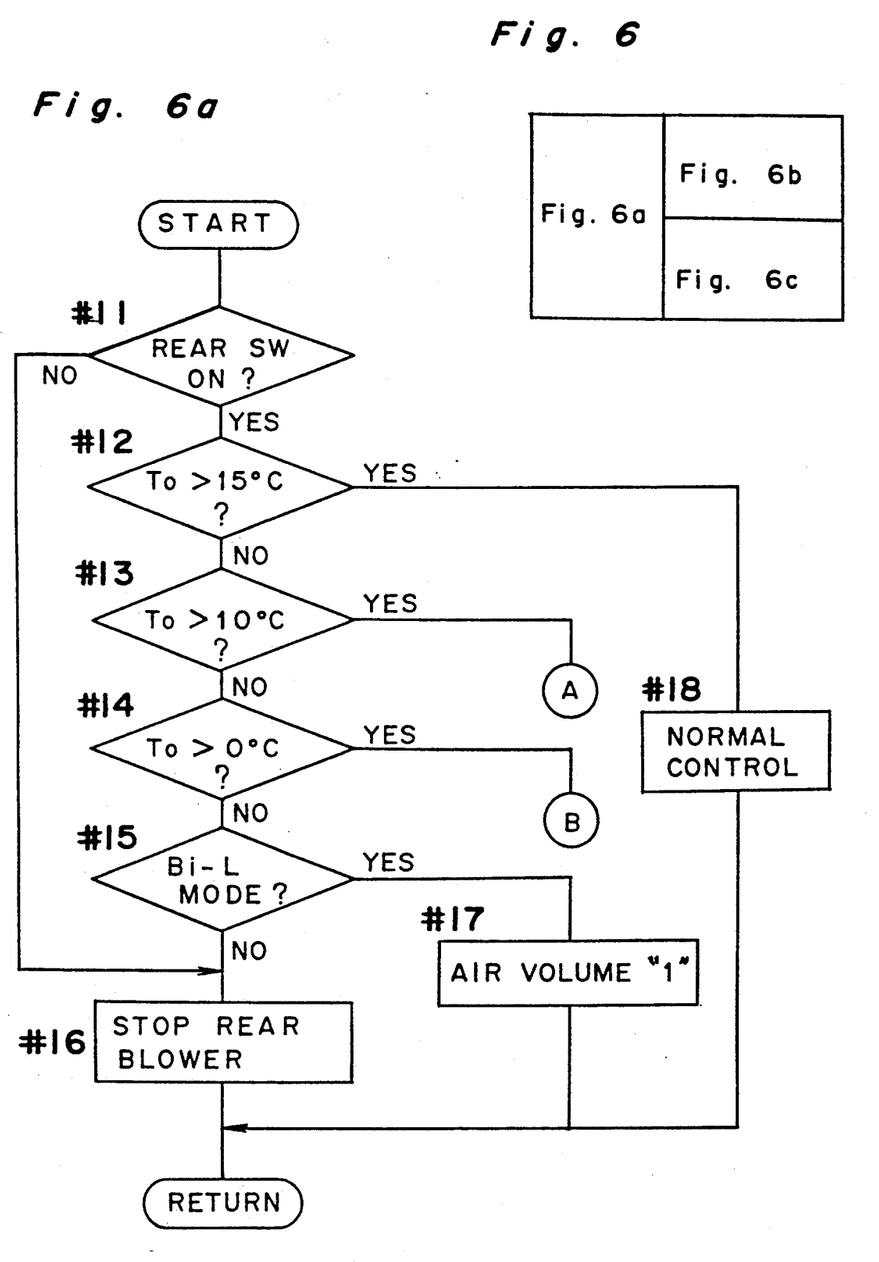
FIGS. 6, 6a, 6b and 6c are flow charts indicative of the operation of a rear blower mounted in a rear duct.
Figure 6B:
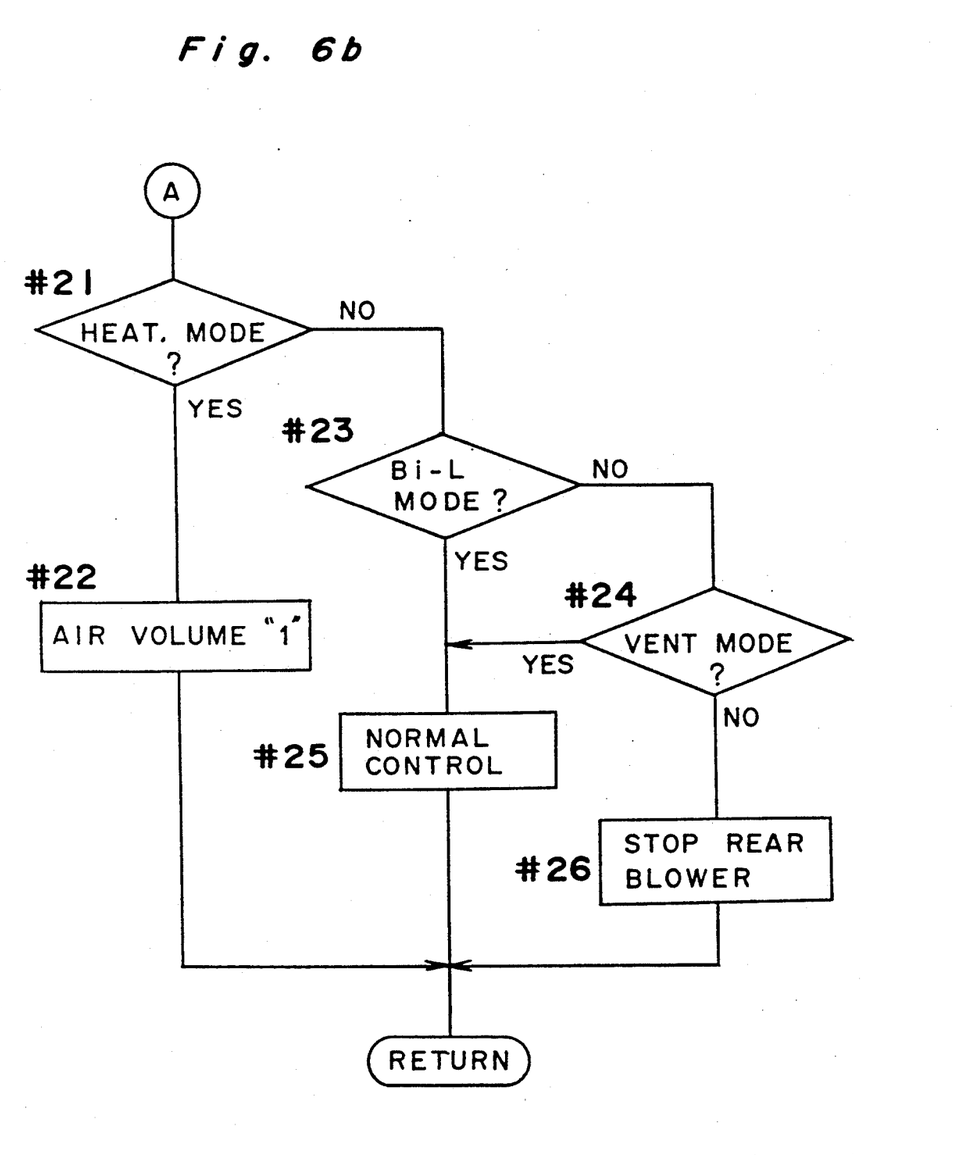
Figure 6C:
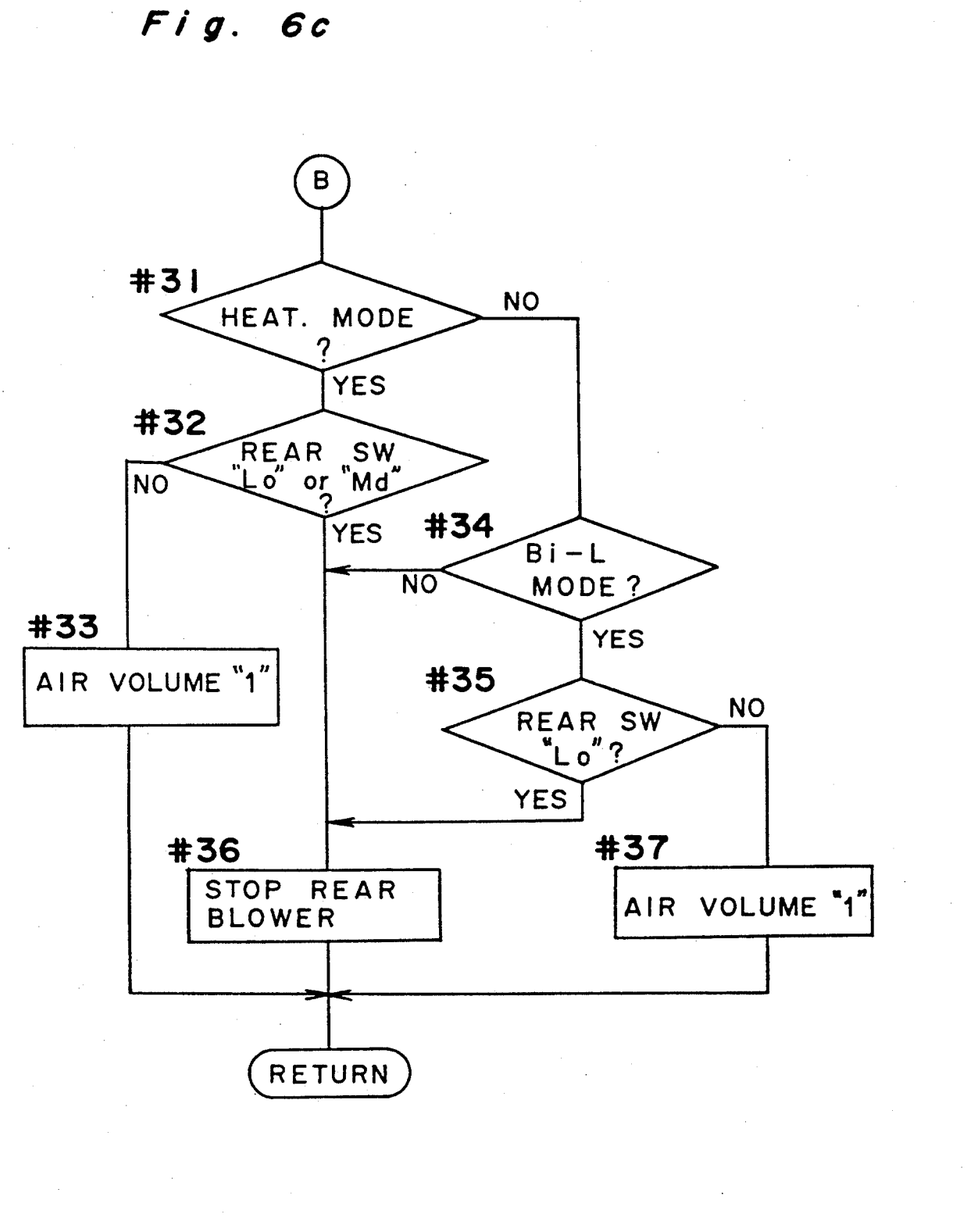

The operation of the above-described rear blower 53 is explained hereinafter with reference to a flow-chart of FIG. 6.

When the operation of the air conditioner starts, it is determined at step #11 whether the ON/OFF switch of the rear switch 55 is on. If YES, it is determined at step #12 whether the temperature To of external air is greater than 15° C. If the result of determination at step #12 is also YES, the rear blower 43 is normally controlled (step #18). In contrast, if the result of determination at step #12 is NO, it is determined at step #13 whether the temperature To of external air is greater than 10° C. If NO, it is further determined at step #14 whether the temperature To of external air is greater than 0° C. If the result of determination at step #14 is NO, i.e., if the temperature To of external air is less than or equal to 0° C., it is determined at step #15 whether the emission mode on the front side is the "Bi-L" mode. If NO, the operation of the rear blower 53 is stopped (step #16), but if YES, the control is performed so that the amount of air to be fed by the rear blower 53 is set at level "1" irrespective of a setting of the volume selector (step #17).

If the result of determination at step #13 is YES, it is determined at step #21 whether the emission mode on the front side is the heating mode. If YES, the control is performed so that the amount of air to be fed by the rear blower 53 is set at level "1" irrespective of a setting of the volume selector (step #22). If NO, it is determined at step #23 whether the emission mode on the front side is the bi-level mode. If the result of determination at step #23 is YES, the control is normally performed (step #25). In contrast, if NO, it is determined at step #24 whether the emission mode on the front side is the vent mode. If the result of determination at step #24 is YES, the control is normally performed (step #25). If NO, the operation of the rear blower 53 is stopped (step #26).

Furthermore, if the result of determination at step #14 is YES, it is determined at step #31 whether the emission mode on the front side is the heating mode. If YES, it is determined at step #32 whether the volume selector is set to "Lo" or "Md". If YES, the operation of the rear blower 53 is stopped (step #36). In contrast, if NO, i.e., if the volume selector is set to "Hi", the control is performed so that the amount of air to be fed by the rear blower 53 is set at level "1" (step #33).

On the other hand, if the result of determination at step #31 is NO, it is determined at step #34 whether the emission mode on the front side is the bi-level mode. If NO, the operation of the rear blower 53 is stopped, but if YES, it is determined at step #35 whether the volume selector is set to "Lo". If YES, the operation of the rear blower 53 is stopped (step #36). In contrast, if NO, i.e., if the volume selector is set to "Md" or "Hi", the control is performed so that the amount of air to be fed by the rear blower 53 is set at level "1" (step #37).

As described above, according to the second embodiment of the present invention, the rear blower 53 is provided intermediately of the rear duct 51. When the temperature of external air is less than or equal to a predetermined temperature (for example 15° C.), the amount of air to be fed by the rear blower 53 is restricted to a smaller value than a setting of the volume selector until the emission mode on the front side is set to the desired heating mode. Accordingly, when the engine is started at a low temperature, the emission of cold air to the rear is restricted, thereby enhancing the comfortability in a rear portion of the passenger compartment.

Although the present invention has been fully described by way of examples with reference to the accompanying drawings, it is to be noted here that various changes and modifications will be apparent to those skilled in the art. Therefore, unless such changes and modifications otherwise depart from the spirit and scope of the present invention, they should be construed as being included therein.

What is claimed is:

1. An air conditioner having a plurality of emission modes in which appropriately regulated air is directed to a plurality of locations on a front side of a passenger compartment defined in an automotive vehicle, said air conditioner comprising:
   a blower unit, disposed on the front side of the passenger compartment, for introducing external air into the passenger compartment or circulating internal air;
   an air chamber formed on a downstream side of said blower unit in a direction of air flow;
   a rear duct, branched and extending rearwardly from said air chamber, for feeding air from said blower unit to a rear portion of the passenger compartment;
   temperature sensor means for sensing a temperature of external air;
   air volume restriction means for restricting an air volume to be fed to said rear portion of said passenger compartment; and
   control means for controlling said air volume restriction means to reduce the air volume to be fed to said rear portion of said passenger compartment when the temperature of external air sensed by said temperature sensor means is less than a given value.

2. The air conditioner according to claim 1, wherein said air volume restriction means continues to restrict the air volume until a desired emission mode is selected.

3. The air conditioner according to claim 2, wherein said desired emission mode is a heating mode.

4. The air conditioner according to claim 1, wherein said air volume restriction means comprises means for opening and closing said rear duct.

5. The air conditioner according to claim 4, wherein said air volume restriction means further comprises a manual switch operatively connected to said means for opening and closing said rear duct and wherein said air volume restriction means continues to restrict the air volume until a desired emission mode is selected.

6. The air conditioner according to claim 5, wherein said desired emission mode is a heating mode.

7. The air conditioner according to claim 1, wherein said air volume restriction means comprises a rear blower mounted in said rear duct and means for controlling the air volume to be fed by said rear blower.

8. The air conditioner according to claim 7, wherein said means for controlling the air volume comprises a manual switch operatively connected to said rear blower and wherein said air volume restriction means restricts the air volume to a smaller value than a setting given by said manual switch until a desired emission mode is selected.

9. The air conditioner according to claim 8, wherein said desired emission mode is a heating mode.

* * * * *